Dec. 10, 1935.  L. A. PARADISE  2,023,899
METHOD OF MAKING A KNIFE HEAD
Filed April 27, 1933
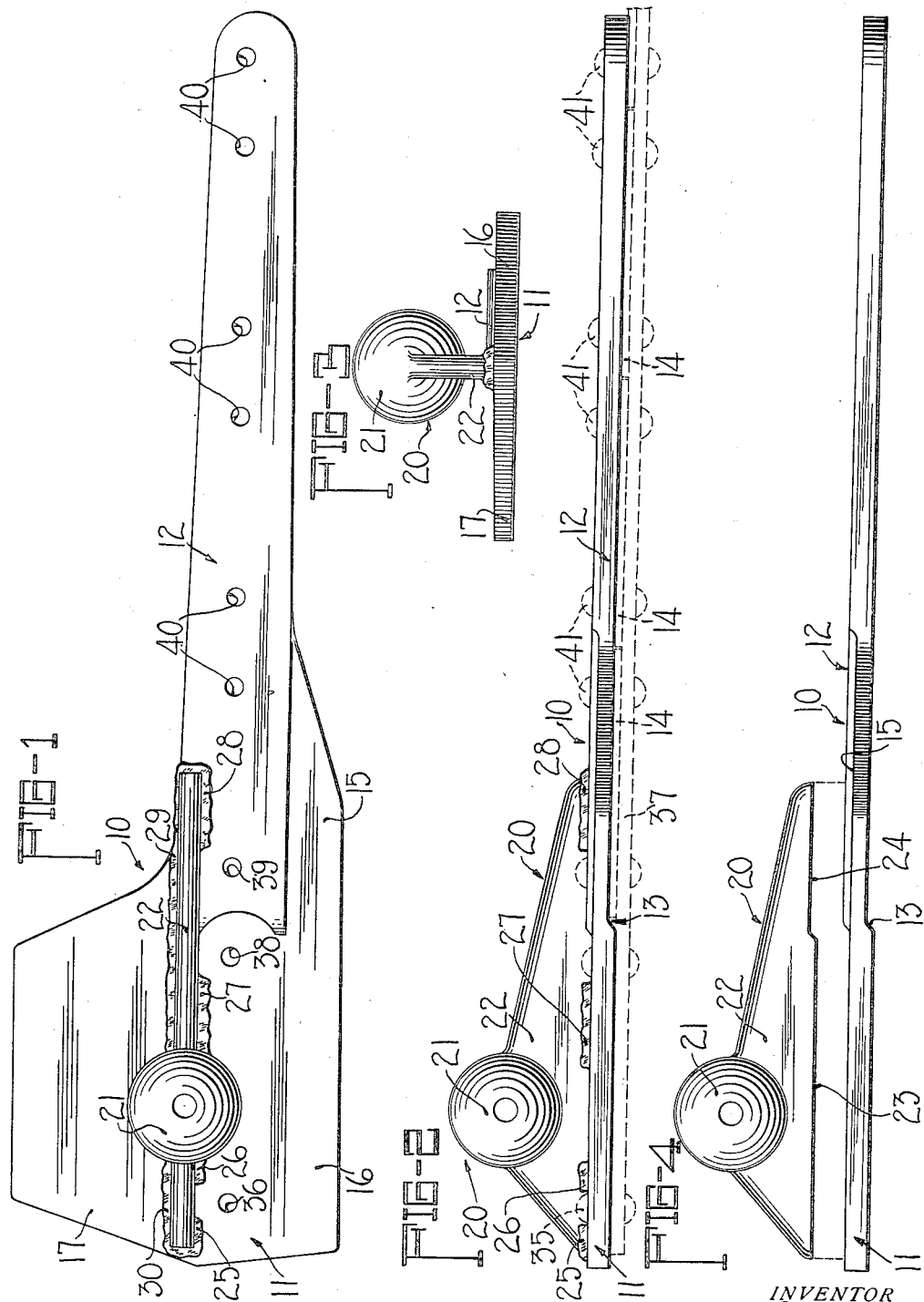
WITNESS.
Edward Melin.
INVENTOR
Louis A. Paradise
BY
E C Bopf ATTORNEY

UNITED STATES PATENT OFFICE 2,023,899

METHOD OF MAKING A KNIFE HEAD

Louis A. Paradise, Moline, Ill., assignor to Deere & Company, Moline, Ill., a corporation of Illinois Application April 27, 1933, Serial No. 668,147

2 Claims. (Cl. 29—148.3)

My invention relates to the cutting apparatus of mowing machines and harvesters and in particular to an improved method of constructing a knife head.

The object of my invention is to introduce a new method of making knife heads by which method a lighter and more durable structure is obtained at less cost than is obtainable with the methods now employed.

In general my method comprises forming the base portion and shank of the knife head as one element, forming the ball element separately and then welding the ball element to the base and shank element. This method has the particular advantage in that it makes it possible to use a special grade of steel for the ball element capable of withstanding the wear to which this member is subjected, permitting the use of a lower grade and less expensive steel for the base and shank portion. More specifically my method comprises forming the base and shank element by punching it out of plate stock, and forming the ball member with the connecting web as a separate element as by casting or by drop forging, and then arc welding the web of the latter element to the base of the former element. This provides a most economical method of manufacture inasmuch as the punching operation is a relatively simple one and the ball and web element a relatively small one simple to cast or forge.

My new knife head and the method of manufacture thereof is described in the following specification and illustrated in the accompanying drawing in which:

Figure 1 is a top view of the finished knife head;

Figure 2 is a side view;

Figure 3 is an end view; and,

Figure 4 is a side view of the two elements of the knife head before they are welded together.

The element 10 of the knife head comprising the base portion 11 and shank portion 12 is blanked out of flat plate material of uniform thickness. In cutting mechanisms with which I am familiar, it is usual to provide an offset between the shank and base equal to the thickness of the knife sections to be affixed thereto in order that the knife back may be extended inwardly across the base of the knife head and be fixed directly thereto as shown in dotted lines in Figure 2. To provide this offset, the base portion 11 and the inner portion of the shank 12 of the blank is heated and then pressed between dies to offset the shank portion, as shown at 13. In this pressing operation, the rear inner portion 15 of the shank 12 is also flattened out so as to bring the surface thereof in the same plane as that of the rear portion 16 of the base 11, this being for the purpose of providing a smooth continuous surface to be contacted by the rear guide usually provided on the shoe arch of a cutting mechanism to hold the knife head against rising upwardly out of position. The front portion 17 of the base 11 may also be given a slight forward taper to form a contacting surface for the usual front guide provided on the shoe arch of a cutting mechanism.

The element 20 comprising ball 21 and web 22 is formed as a separate integral element, either as a steel casting, or by drop forging, preferably the latter. The under side of web 22 is provided with two straight portions 23 and 24, the latter being offset slightly to correspond to the shape of the upper surface of base 11 and shank 12. The two elements 10 and 20 are then placed in a jig and preferably arc welded together as shown in Figure 1 at points 25, 26, 27, 28, 29, and 30. The spaces between points 26 and 27 and 29 and 30 are provided to give clearance for the pitman straps on the pitman which make connection with the ball 21. The space between points 25 and 26 is provided to assure clearance for the riveting tool in forming the head on rivet 35 inserted through perforation 36 and by which the inner end of the knife back 37 is fixed to the base 11 of the knife head. The space between points 27 and 28 is also provided to give clearance for the riveting tool in forming heads on the rivets positioned in holes 38 and 39, the former fixing knife back 37 to base portion 11 and the latter passing through both the knife back 37 and the inner section 14. Holes 36, 38, 39, and holes 40 provided in the shank portion 12 for receiving rivets 41, are punched in element 10 after the element 20 has been welded thereto. In this punching operation the ball 21 is used as a gauge for locating the holes so that they will be properly positioned with respect thereto.

A knife head manufactured in the above manner by reason of both elements being constructed of steel, one out of plate stock and the other preferably as a drop forging, a lighter construction may be employed than is necessary when the knife head is made of a single casting as is now the common practice and at the same time a much stronger article is obtained. It has also been proposed to make the knife head as one single forging. Such method, however, is wasteful of material and requires complicated forging dies, which increases the cost of manufacture materially. The present method is especially economical as regards the amount of material required in its construction and does not require the use of special equipment. Both of these factors make my new method a particularly desirable one.

Having described my invention, what I claim as new and desire to secure by Letters Patent is set forth in the following claims:

1. The method of making a knife head comprising a flat base and a shank extending laterally therefrom, a web extending perpendicularly from the face of the base and supporting a ball in spaced relation to the base, which consists in forming the base and the shank as one integral element by blanking from plate stock of substantially uniform thickness, offsetting the shank portion relative to the base portion an amount equal to the thickness of the knife sections to be riveted to the shank portion, forming the ball and the web as another integral element, and then fixedly uniting the base of the web of the latter element to the face of the base of the former element.

2. The method of making a knife head comprising a flat base and a shank extending laterally therefrom, a web extending perpendicularly from the face of the base and supporting a ball in spaced relation to the base, which consists in forming the base and the shank as one integral element by blanking from plate stock of substantially uniform thickness, forming the ball and the entire web as another integral element, and then fixedly uniting the base of the web of the latter element to the face of the base of the former element.

LOUIS A. PARADISE.